(12) United States Patent
Nagase et al.

(10) Patent No.: US 7,040,450 B2
(45) Date of Patent: May 9, 2006

(54) POWER-ASSISTED STEERING SYSTEM

(75) Inventors: Shigeki Nagase, Mie (JP); Masahiko Sakamaki, Aichi (JP); Takeshi Ueda, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/969,006

(22) Filed: Oct. 21, 2004

(65) Prior Publication Data
US 2005/0125124 A1  Jun. 9, 2005

(30) Foreign Application Priority Data
Oct. 22, 2003  (JP)  ............... P. 2003-362217

(51) Int. Cl.
*B62D 5/04*  (2006.01)
(52) U.S. Cl. .............. 180/443; 180/446; 180/444; 701/41; 701/42
(58) Field of Classification Search ............... 180/443, 180/446; 701/41, 42
See application file for complete search history.

(56) References Cited

U.S. PATENT DOCUMENTS 6,148,949 A * 11/2000 Kobayashi et al. ......... 180/446

| | | | |
|---|---|---|---|
| 2003/0100981 A1 * | 5/2003 | Suzuki | 701/43 |
| 2003/0155172 A1 * | 8/2003 | Kawada et al. | 180/446 |
| 2004/0206569 A1 * | 10/2004 | Kodama et al. | 180/402 |
| 2004/0222033 A1 * | 11/2004 | Kameya | 180/404 |
| 2004/0267421 A1 * | 12/2004 | Eskritt et al. | 701/41 |

FOREIGN PATENT DOCUMENTS

| JP | 8-119132 | 5/1996 |
|---|---|---|
| JP | 2847406 | 11/1998 |

* cited by examiner

*Primary Examiner*—Lesley D. Morris
*Assistant Examiner*—Marlon Arce-Diaz
(74) *Attorney, Agent, or Firm*—McGinn IP Law Group, PLLC

(57) ABSTRACT

A power-assisted steering system includes a current detector for detecting sequentially current flowing to a ground-side switching element in a lower arm by a detection resistor inserted into the lower arm not only in a time period when the switching element is ON but also in time period when the switching element is OFF, an offset updating unit for sequentially updating an offset correction value with detected values in the time period when the switching element is OFF, and a detected current correcting unit for calculating a motor current value (a corrected current detected value) by correcting detected values in the time period when the switching element is ON with the offset correction value thereby updating.

22 Claims, 6 Drawing Sheets

POWER-ASSISTED STEERING SYSTEM

BACKGROUND OF THE INVENTION

The present invention relates to a power-assisted steering system for applying an auxiliary steering force to a steering mechanism of a vehicle by an electric motor, and more particularly, to the detection of current flowing to the electric motor.

Generally, an electric power-assisted steering system has been in use in which a steering mechanism is provided with an auxiliary steering force by driving an electric motor in accordance with a steering torque exerted on a steering wheel by a driver of the vehicle. A torque sensor is provided in the electric power-assisted steering system for detecting a steering torque exerted on the steering wheel, which is a manipulating device for steering the vehicle. A target value for a current (hereinafter, referred to as a "current target value") that is to be supplied to the electric motor is set based on the steering torque detected by the torque sensor. Then, a command value that is to be provided to a driving device for the electric motor is generated through a proportional integration operation based on a deviation between the target current value and the value of current that is actually made to flow to the electric motor. The electric motor driving device includes a PWM signal generating circuit for generating a pulse width modulation signal (hereinafter, referred to as a "PWM signal") having a duty ratio which corresponds to the command value and a motor driving circuit which is configured by utilizing a power transistor which is on and off in accordance with the duty ratio of the PWM signal and applies to the electric motor a voltage which corresponds to the duty ratio. A current caused to flow to the electric motor by the application of the voltage is detected by a current detector, and a difference between the current target value and the current detected value is used as the deviation for generating the command value.

In the configuration, there occurs a case where current is actually detected by the current detector irrespective of the fact that current that is made to flow to the motor is nil. The current is referred to as an offset current, and a detected current value by the current detector during the operation of the motor is such that the offset current is superimposed on the current flowing to the motor. This offset current constitutes a cause of the generation of an error (referred to as an "offset error") in the detected current value detected by the current detector. In the event that the offset error is generated, since the detected current value does not coincide with the value of current actually flowing to the motors the current control of the motor cannot be implemented as set, and as a result, the driver is forced to be provided with a feeling of physical disorder.

Incidentally, while motors with a brush have been in use as a driving source of conventional electric power-assisted steering systems, in recent years, brushless motors are also in use in conventional electric power-assisted steering systems with a view to enhancing reliability and durability, and reducing the inertia. In the electric power-assisted steering systems utilizing the brushless motors, in case the off set error is generated in the power-assisted steering systems, a torque ripple is generated at the time of steering. Since this torque ripple causes the driver to feel a feeling of physical disorder much when manipulating the steering wheel, the offset error has been causing a specific problem in the electric power-assisted steering systems utilizing the brushless motors.

To cope with the problem, a patent literature No. 1 discloses a current detecting circuit for an electric motor in which current to the electric motor which connects so as to bridge the bridge circuits of switching elements is detected by a current detector, comprising a means for making a current detection signal of the current detector resulting when the electric motor is not driven correspond to a state in which current to the electric motor is nil. According to the current detecting circuit for an electric motor, the offset error can be corrected, and in the event that the correction of the offset error is performed in the electric power-assisted steering system, a torque ripple attributed to the offset error can be suppressed. Then, there has been proposed a conventional electric power-assisted steering system in which a detected value detected by a current detector at the time of assembly of the electric power-assisted steering system or activating the same (when a power supply is made by switching on an ignition) is written to be retained as an offset correction value, so that a detected value detected by the current detector during the operation of the electric motor is corrected by the offset correction value so retained (for example, refer to a paragraph entitled "Description of the Related Art" of a patent literature No. 2).

However, since the offset value of the current detector varies due to a change in environment such as a change in temperature during the operation of the motor after the power supply to the electric power-assisted steering system has been made, there occurs a case where the detected value of the current detector cannot be corrected sufficiently with the retained offset correction value.

To cope with this, there is also known an electric power-assisted steering system in which a special state such that no motor current flows during the control of the motor after a power supply has been made is set on the premise the aforesaid configuration exists, so that the offset correction value is updated with a detected value detected by the current detector in the state so set (for example, refer to the patent literature No. 2).

However, due to the necessity of setting the system in such a special state, there occur a case where the motor control operation discontinues to thereby make the driver feel a feeling of physical disorder and a case where timings when the offset correction value can be updated are limited, whereby the offset correction value cannot be updated when such a correction is really needed.

Patent Literature No. 1: Japanese Examined Patent Publication No. 2847406

Patent Literature No. 2: JP-A-8-119132

With a view to solving the problems inherent in the related art, it is preferred that the offset correction value for use in correcting the offset error can be updated any time during the operation of the electric power-assisted steering system after the power supply thereto has been made.

SUMMARY OF THE INVENTION

Then, an object of the invention is to provide a power-assisted steering system in which an offset correction value for use in correcting an offset error in the detection of a motor current can be updated based on a measured value any time even during the operation of the power-assisted steering system, thereby making it possible to prevent a driver from being made to feel a feeling of physical disorder when manipulating a steering wheel of a vehicle.

In order to solve the aforesaid object, the invention is characterized by having the following arrangement.

(1) A power-assisted steering system for applying an auxiliary steering force to a steering mechanism of a vehicle by driving an electric motor based on a target value determined in accordance with an operation by an operation unit for steering the vehicle, the power-assisted steering-system comprising:

a PWM type driving circuit that includes a switching element pair having a first switching element disposed on a power supply line side and a second switching element disposed on a grounded line side and connected to each other in series, adapted to supply current to the electric motor from a connecting point between the first switching element and the second switching element;

a current detector that detects current flowing to one of the first switching element and the second switching element;

a correcting unit that corrects a detected value of the current detected by the current detector when the one of the first and second switching elements is in an ON state based on a detected value of current detected by the current detector when the one of the first and second switching elements is in an OFF state, and outputs the corrected detected value; and a controller that controls the driving of the electric motor by switching on and off the first switching element and the second switching element based on the target value and the corrected detected value.

(2) The power-assisted steering system according to (1), wherein the current detector detects current flowing to the one of the first and second switching elements in each period when the one of the first and second switching elements is put in the ON state and in each period when the one of the first and second switching elements is put in the OFF state, and wherein the correcting unit includes:

a detected-current-value correcting unit that retains, as an offset correction value, the detected value of current detected by the current detector when the one of the first and second switching elements is in the OFF state, corrects the detected value of current detected by the current detector when the one of the first and second switching elements is in the ON state based on the offset correction value, and outputs the corrected detected value after the correction; and an offset updating unit that updates, as a new offset correction value, the retained offset correction value with a detected value of current detected by the current detector when the one of the first and second switching element is in the OFF state.

(3) The power-assisted steering system according to (1), wherein the current detector includes a detection resistor inserted between the one of the first and second switching elements and the power supply side or the grounded side and detects current flowing to the one of the first and second switching elements based on a voltage between opposite ends of the detection resistor.

According to the invention, in the PWM type driving circuit, the detected value of current flowing to one of the first switching element disposed on the power supply line side and the second switching element disposed on the grounded line side when the one of the first and second switching elements is in the ON state is corrected based on the detected value of current flowing to the one of the first and second switching elements when the one of the first and second switching element is in the OFF state, and the driving of the electric motor is controlled based on the detected value after the correction. Thus, since the current value detected when the one of the first and second switching elements is in the OFF state is used as the offset correction value for correcting the offset error, the update of the offset correction value for correcting the offset error in the detection of the motor current can be implemented any time based on the measured value without needing to set the power-assisted steering system in the special states thereby making it possible to provide the power-assisted steering system which prevents the driver from being made to feel a feeling of physical disorder when manipulating the steering wheel. In addition, in the event that a brushless motor is used as a driving source, since there can be provided a torque ripple suppressing effect, the invention becomes particularly effective.

According to the invention, in the PWM type driving circuit, current flowing to the one of the first switching element disposed on the power supply line side and the second switching element disposed on the grounded line side in each period when the one of the first and second switching elements is put in the OFF state is detected, and the offset correction value is updated with the detected value. Consequently, the correction of the offset error in the detection of the motor current can be implemented with the offset correction value which can be obtained from the latest measurement without needing to set the power-assisted steering system in the special state.

According to the invention, the motor current can be detected based on the voltage between the ends of the detection resistor inserted in the PWM type driving circuit, and the offset correction value for correcting the offset error of the detected value of the motor current. Consequently, the highly accurate offset correction can be enabled by the simply configured current detector.

DETAILED DESCRIPTION OF PREFERRED EMBODIMENTS

Hereinafter, an embodiment of the invention will be described by reference to the accompanying drawings.

<1. Overall Configuration>

Figure 1:
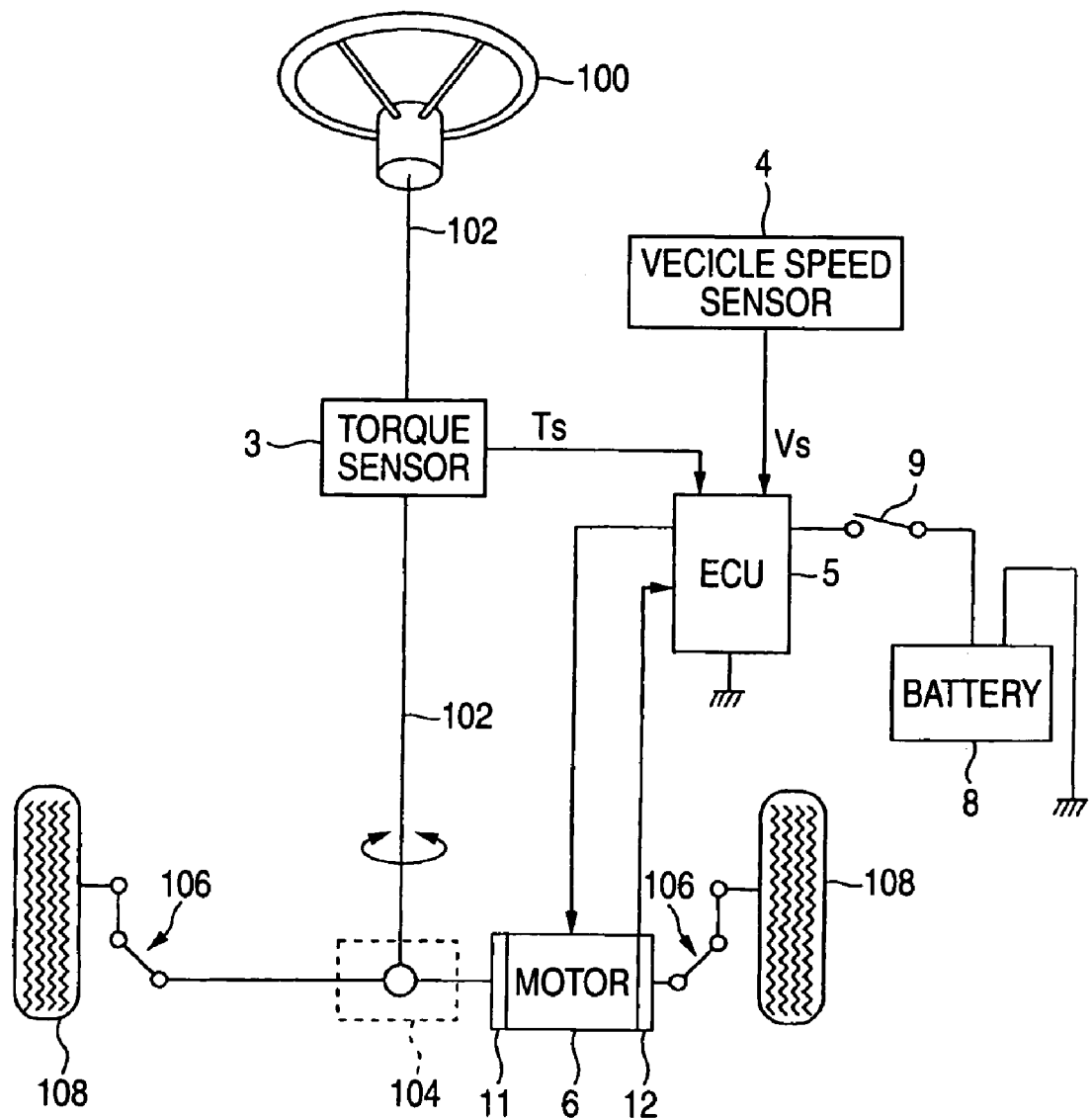
FIG. 1 is a schematic drawing showing the configuration of an electric power-assisted steering system according to an embodiment of the invention, together with the configuration of a vehicle which is associated with the electric power-assisted steering system.

FIG. 1 is a schematic diagram showing the configuration of an electric power-assisted steering system according to an embodiment of the invention, together with the configuration of a vehicle which is associated with the electric power-assisted steering system. This electric power-assisted steering system includes a steering shaft 102 which is connected at one end thereof to a steering wheel 100 as a manipulating device for steering, a rack and pinion mechanism 104 coupled to the other end of the steering shaft 102, a torque sensor 3 for detecting a steering torque Ts exerted on the steering shaft 102 through the manipulation of the steering wheel 100, a vehicle speed sensor 4 for outputting a vehicle speed signal Vs indicating a running speed of the vehicle, a 3-phase brushless motor 6 for generating an auxiliary steering force to reduce a load borne by the driver when manipulating the steering wheel, a ball screw driving portion 11 for transmitting the auxiliary steering force to a rack shaft, a position detecting sensor 12 for detecting the rotational position of a rotor of the brushless motor 6 and an electronic control unit (ECU) 5 which receives a power supply from an on-board battery 8 for controlling the driving of the motor 6 based on sensor signals from the torque sensor 3, the vehicle speed sensor 4 and the position detecting sensor 12.

When the driver manipulates the steering wheel 100, the motor 6 is driven by the ECU 5 based on a steering torque Ts detected by the torque sensor 3, a vehicle speed indicated by a vehicle speed signal Vs from the vehicle speed sensor 4 and the rotational position of the rotor detected by the position detecting sensor 12, whereby the motor 6 generates an auxiliary steering force, and the auxiliary steering force so generated is transmitted to the rack shaft via the ball screw driving portion 11 so that the load borne by the driver is reduced. Namely, the rack shaft performs reciprocating motions by the steering torque Ts exerted through the manipulation of the steering wheel and the auxiliary steering force generated by the motor 6. Both ends of the rack shaft are connected to wheels 8, respectively, via coupling members each made up of a tie rod and a knuckle arm, whereby the direction of the wheels 108 varies according to the reciprocating motions of the rack shaft.

<2. Configuration and Operation of the Control Unit>

In a case where a brushless motor is used as a driving source for an electric power-assisted steering system, generally, the following feedback control by a sine-wave current is implemented.

A brushless motor is normally made up of a rotor comprising a permanent magnet functioning as a field and a stator comprising a 3-phase coil comprising, in turn, a U-phase, a V-phase and a W-phase. In a drive control unit of the brushless motor, a voltage command value is calculated through a proportional integration operation such that current whose target value is set in accordance with the steering torque is made to flow to the motor, and a sine-wave voltage, which varies in a sine-wave fashion according to the rotational position of the rotor, is applied to the motor based on the voltage command value so calculated. The electric power-assisted steering system includes a current control device for controlling the motor current as has just been described, and in this current controlling device, normally, the voltage and current as the 3-phase alternating current associated with the driving of the motor are represented by a revolving orthogonal coordinates system (also referred to as "d-q coordinates") comprising a d-axis (also referred to as a "direct axis") which follows the direction of a magnetic flux by the field as the rotor and a q-axis (also referred to as a "transverse axis") which is normal to the d-axis and whose phase advances by $\pi/2$ from the d-axis. According to the d-q coordinates, a current made to flow to the motor can be treated as a direct current comprising a d-axis component and a q-axis component. In this case, a proportional integration operation of a deviation between a current target value and a detected value of current actually flowing to the motor is performed on each of the d-axis component and the q-axis component, whereby a d-axis voltage command value and a q-axis voltage command value are calculated as a voltage command value for driving the brushless motor through those proportional integration operations. Then, these d-axis and q-axis voltage command values are transformed through a coordinate transformation into U-phase, V-phase and W-phase voltage command values which are voltage command values varying in a sine-wave fashion in accordance with the rotational position of the rotor, and the brushless motor is driven based on the U-phase, V-phase and W-phase voltage command values.

Also, in this embodiment, a d-q coordinates system as described above is introduced, and the brushless motor 6 is driven based on values on the d-q coordinates which represent the current target value and the detected value of the rotor current, respectively.

Figure 2:
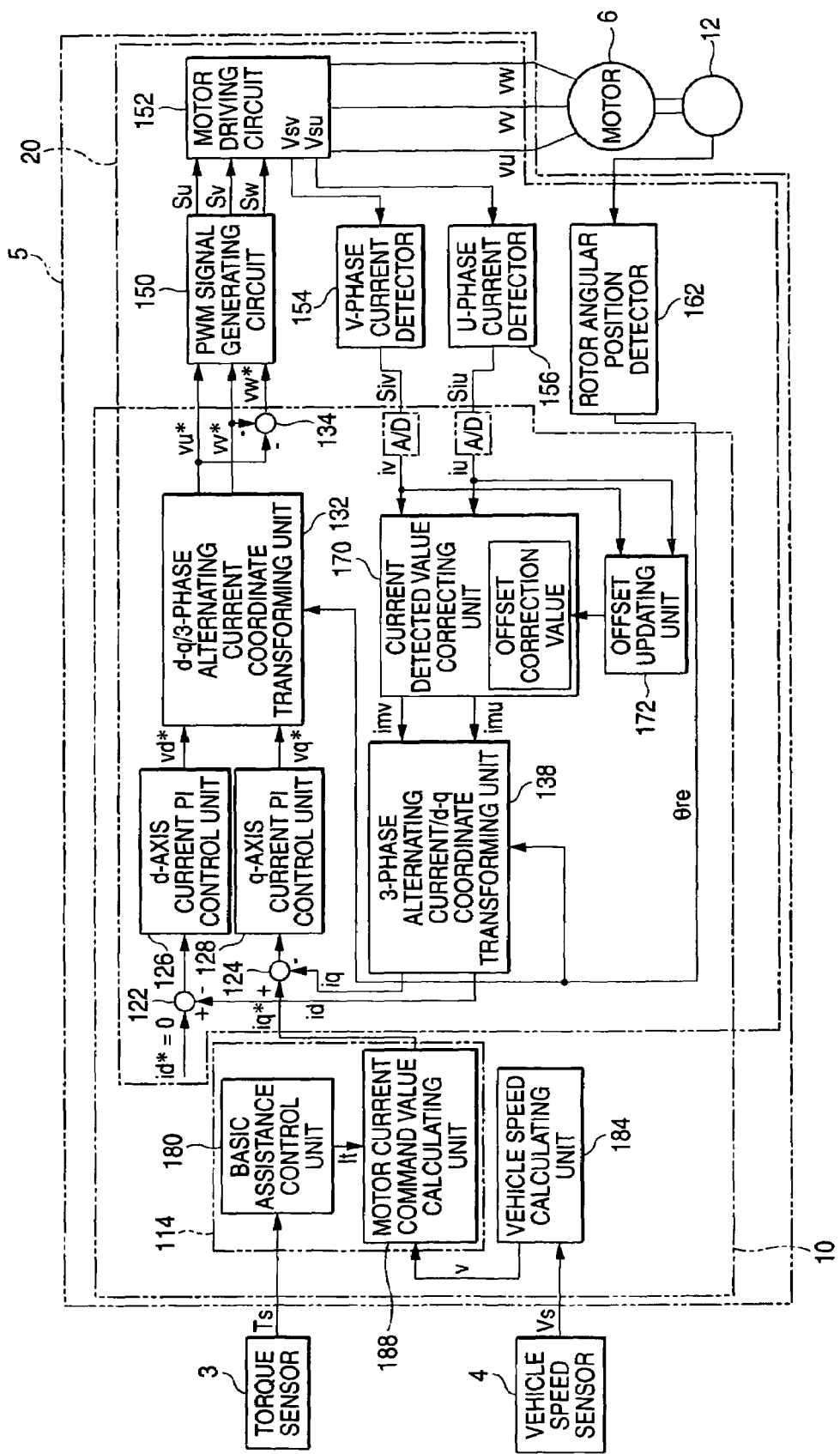
FIG. 2 is a block diagram showing the functional configuration of an ECU which is a control unit in the electric power-assisted steering system according to the embodiment.

FIG. 2 is a block diagram showing the configuration of the ECU 5 which is a control unit for the electric power-assisted steering system according to the embodiment of the invention. The ECU 5 is made up of a microcomputer 10 and a motor driving unit. The microcomputer 10 functions by executing a program stored in a memory installed therein as a motor control unit including a vehicle speed calculating unit 184, a target current calculating unit 114, subtracters 122, 124, a d-axis current PI control unit 126, a q-axis current PI control unit 128, a d-q/3-phase alternating current coordinates transforming unit 132, a sign reversal adder 134, a 3-phase alternating current/d-q coordinates transforming unit 138, a detected current correcting unit 170, and an offset updating unit 172. The target current calculating unit 114 includes a basic assistance control unit 180 and a motor current command value calculating unit 188. The motor driving unit is a hardware (a circuit) for driving the 3-phase brushless motor 6 based on a voltage command value outputted from the microcomputer 10 which functions as the motor control unit, and is made up of a PWM signal generating circuit 150, a motor driving circuit 152, a U-phase current detector 15, a V-phase current detector 154, and a rotor angular position detector 162.

In a vehicle installed with the electric power-assisted steering system, when the steering wheel 100 is operated, a steering torque Ts detected by the torque sensor 3 is inputted into the ECU 5, and a vehicle speed signal Vs detected by the vehicle speed sensor 4 is also inputted into the ECU 5. In the vehicle speed calculating unit 184, a vehicle speed V is calculated based on the vehicle speed signal Vs. In addition, the rotor angular position detector 162 outputs a signal indicating the position or electric angle θre of the revolving field which is the rotor of the motor 6 based on a sensor signal outputted from the position detecting sensor 12 mounted on the motor 6.

The basic assistance control unit 180 determines a current target value It that is made to flow to the motor 6 based on the steering torque Ts and the vehicle speed V by referring to a table referred to as an assist map in which a steering torque is made to correspond to a current target value. The motor current command value calculating unit 188 outputs a q-axis current command value iq* based on the current target value It so determined.

The q-axis current command value iq* outputted from the motor current command value calculating unit 188 is a current value which corresponds to a torque that is to be generated by the motor 6 and is inputted into the subtracter 124. On the other hand, since a d-axis current command value id* has no relation to torque, the d-axis current command value id* is inputted into the subtracter 122 as id*=0.

The U-phase current detector 156 and the V-phase current detector 154 detect current flowing to a U-phase coil and a V-phase coil of the motor, respectively, and output a U-phase current detection signal Siu and a V-phase current detection signal Siv, respectively. In this embodiment, as will be described later on, detection resistors are inserted between power switching elements corresponding, respectively, to the U-phase and the V-phase and the grounded line within the motor driving circuit 152, and the U-phase current detector 156 and the V-phase current detector 154 output a U-phase current detection signal Siu and a V-phase current detection signal Siv, respectively, based on voltages between ends of the detection resistors so inserted. Here, while the U-phase current detection signal Siu and the V-phase current detection signal Siv are voltage signals which indicate the value of U-phase current which actually flows to the motor 6 and the value of V-phase current which actually flows to the motor 6, respectively, the current values indicated by these voltage signals are such that the value of offset current is superimposed on the value of current which actually flows to the motor. The U-phase current detection signal Siu and the V-phase current detection signal Siv are inputted into the detected current value correcting unit 170 and the offset updating unit 172. Note that in terms of hardware, the U-phase current detection signal Siu and the V-phase current detection signal Siv which are analog voltage signals are inputted into the microcomputer 10 and are then converted into digital values as sampling values which indicate a U-phase current detected value and a V-phase current detected value, respectively, by an A/D converter. Then, the U-phase current detected value (hereinafter, this is indicated by a symbol "iu") and the V-phase current detected value (hereinafter, this is indicated by a symbol "iv"), which are digital values, are inputted into the detected current value correcting unit 170 and the offset updating unit 172 which are realized by the microcomputer 10 in terms of software. These detected current value correcting unit 170 and the offset updating unit 172 function as correcting devices for calculating a U-phase motor current value (a U-phase current detected value after correction) imu and a V-phase motor current value (a V-phase current detected value after correction) imv by applying an offset correction to the U-phase current detected value iu and the V-phase current detected value iv.

The detected current value correcting unit 170 retains a U-phase current detected value resulting when the U-phase current flowing to the motor 6 is zero as a U-phase offset correction value iuO and a V-phase current detected value resulting when the V-phase current flowing to the motor 6 is zero as a V-phase offset correction value ivO, respectively, and outputs the U-phase motor current value imu and the V-phase motor current value imv by correcting the U-phase current detected value iu and the V-phase current detected value iv based on the offset correction values iuO and ivO. The offset updating unit 172 receives sequentially fresh offset correction values from the U-phase current detected value iu and the V-phase current detected value iv and sequentially updates the offset correction values iuO and ivO which are retained in the detected current value correcting unit 170 with the fresh offset correction values so received. The operation of the detected current value correcting unit 170 and the offset updating unit 172 will be described in detail later on.

The 3-phase alternating current/d-q coordinates transforming unit 138 transforms the U-phase motor current value imu and the V-phase motor current value imv into a d-axis motor current value id and a q-axis motor current value iq which are values on d-q coordinates based on the electric angle θre of the rotor. The d-axis motor current value id and the q-axis motor current value iq are inputted into the subtracter 122 and the subtracter 124, respectively.

The subtracter 122 outputs a deviation id*-id between the di-axis current command value id* and the d-axis motor current value id, and the d-axis current PI control unit 126 generates a d-axis voltage command value vd* through a proportional integration operation based on the deviation id*-id. On the other hand, the subtracter 124 outputs a deviation iq*-iq between the q-axis current command value iq* and the q-axis motor current value iq, and the q-axis current PI control unit 128 generates a q-axis voltage command value vq* through a proportional integration operation based on the deviation iq*-iq. The d-axis voltage command value vd* and the q-axis voltage command value vq* which are so generated are then inputted into the d-q/3-phase alternating current coordinates transforming unit 132. The d-q/3-phase alternating current coordinates transforming unit 132 transforms the d-axis voltage command value vd* and the q-axis voltage command value vq* into a U-phase voltage command value vu* and a V-phase voltage command value vv* which are values on the 3-phase alternating current coordinates based on the electric angle θre of the rotor. Then, the sign reversal adder 134 calculates a W-phase voltage command value vw* from the U-phase voltage command value vu* and the V-phase voltage command value vv*. The U-phase voltage command value vu*, V-phase voltage command value vv* and W-phase voltage command value vw* which are so obtained are outputted from the microcomputer 10 to be inputted into the PWM signal generating circuit 150.

The PWM signal generating circuit 150 generates PWM signals Su, Sv, Sw whose duty ratios vary according to the U-phase voltage command value vu*, the V-phase voltage command value vv* and the W-phase voltage command value vw*, respectively. The motor driving circuit 152 generates phase voltages vu, vv, vw which correspond, respectively, to the duty ratios of the PWM signals Su, Sv, Sw by switching on and off the power switching elements by the PWM signals Su, Su, Sw. Note that as will be described later on, the motor driving circuit 152 has two FETs (field-effect transistors) which are power switching elements adapted to be switched on and off in such a manner as to oppose each other, and the PWM signal Su which corresponds to the U-phase is constituted by two PWM signals S1u and S2u which are applied to gate terminals of two FETs which correspond to the U-phase, the PWM signal Sv which corresponds to the V-phase is constituted by two PWM signals S1v and S2v which are applied to gate terminals of two FETs which correspond to the V-phase, and the PWM signal Sw which corresponds to the W-phase is constituted by two PWM signals S1w and S2w which are applied to gate terminals of two FETs which correspond to the W-phase.

The respective phase voltages vu, vv, vw which are generated as has just been described are then outputted from the ECU 5 so as to be applied to the motor 6. Current flows to coils (not shown) of the respective phases u, v, w according to the voltage application, whereby the motor 6 generates a steering assistance torque (a motor torque) according to the current.

<3. Layout Examples of Detection Resistors for Detecting Motor Current>

Next, referring to FIGS. 3 to 5, layout examples will be described below of the detection resistors which are inserted in the motor driving circuit 152 to detect current flowing to the respective phases of the brushless motor. Note that the configuration of the ECU 5 in the embodiment is based on a layout example shown in FIG. 3.

Figure 3:
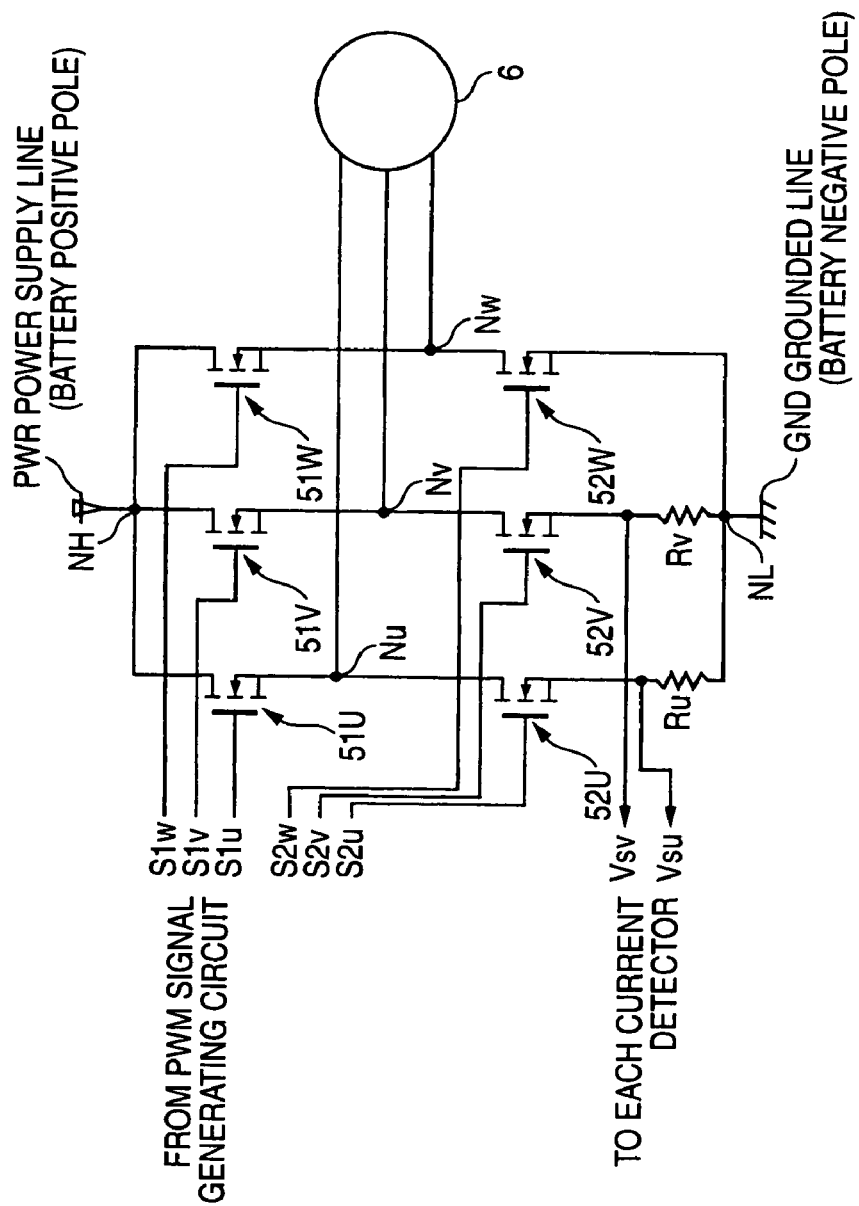
FIG. 3 is a circuit diagram showing a first layout example of detection resistors which are inserted into a motor driving circuit for detecting current in respective phases of a brushless motor.

FIG. 3 is a circuit diagram showing a first layout example of detection resistors which are inserted in the motor driving circuit 152 to detect current flowing to the respective phases of the brushless motor 6. FIG. 3 shows the configuration of the motor driving circuit 152, and in the circuit shown in FIG. 3, a power supply line PWR is connected to a positive terminal of the battery 8 via an ignition switch 9, and a grounded line GND is connected to a negative terminal of the battery 8. As shown in FIG. 3, the motor driving circuit 152 is a PWM type driving circuit and includes FETs 51U, 51V, 51W which are disposed on a power supply line PWR side and which constitute power switching elements which correspond to the U-phase, V-phase and W-phase, respectively and FETs 52U, 52V, 52W which are disposed on a grounded line GND side and which constitute power switching elements which correspond to the U-phase, V-phase and W-phase, respectively, and the power supply side FET (hereinafter, referred to as a "Hi-side FET") 51X and the grounded line side FET (hereinafter, referred to as a "Lo-side FET") 52X which correspond to the same phase are connected in series in such a manner as to make a pair. In general, a circuit portion on the power supply line including the FETs 51U, 51V, 51W is referred to as an "upper arm", and a circuit portion on the grounded line side including the FETs 52U, 52V, 52W is referred to as a "lower arm". Respective connecting points Nu, Nv, Nw between the upper arm and the lower arm correspond to a connecting point between the Hi side FET 51X and the Lo side FET 52X (X=U, V, W) which correspond to the same phase, and the connecting points Nu, Nv, Nw are connected to the U-phase, V-phase and W-phase of the motor 6, respectively.

PWM signals S1u, S1v, S1w are provided to gate terminals of the Hi-side FETs 51U, 51V, 51W, respectively, whereby the Hi-side FETs 51U, 51V, 51W are switched on and off. In addition, PWM signals S2u, S2v, S2w are provided to gate terminals of the Lo-side FETs 52U, 52V, 52W, respectively, whereby the Lo-side FETS 52U, 52V, 52W are switched on and off in an opposite fashion to the H-side FETs 51U, 51V, 51W, respectively.

In the motor driving circuit 152 configured as has just been described above, assuming that a connecting point where the grounded line GND branches toward the Lo-side FETs 52U, 52V, 52W is referred to as a "ground-side branch point NL," in the example shown in FIG. 3, a detection resistor Ru for detecting current flowing to the Lo-side FET 52U or current flowing to a lower arm corresponding to the U-phase (hereinafter, referred to as a "U-phase current detection resistor") is inserted between the Lo-side FET 52U corresponding to the U-phase and the ground-side branch point NL. In addition, a detection resistor Rv for detecting current flowing to the Lo-side FET 52V or current flowing to a lower arm corresponding to the V-phase (hereinafter, referred to as a "V-phase current detection resistor") is inserted between the Lo-side FET 52V corresponding to the V-phase and the ground-side branch point NL. In contrast, no detection resistor is inserted between the Lo-side FET 52W corresponding to the W-phase and the ground-side branch point NL.

Then, a connecting point between the Lo-side FET 52U and the U-phase current detection resistor Ru is connected to an input terminal of the U-phase current detector 156, and the U-phase current detector 156 outputs a signal indicating the electric potential Vsu of the connecting point which is so measured from the grounded line GND which constitutes a reference or a voltage between ends of the U-phase current detection resistor Ru as the previously described U-phase current detection signal Siu (refer to FIG. 2). In addition, a connecting point between the Lo-side FET 52V and the V-phase current detection resistor Rv is connected to an input terminal of the V-phase current detector 154 and the V-phase current detector 154 outputs a signal indicating the electric potential Vsv of the connecting point which is so measured from the grounded line GND which constitutes a reference or a voltage between ends of the V-phase current detection resistor Rv as the previously described V-phase current detection signal Siv. Note that since current flowing into the brushless motor 6 is regarded as positive, the U-phase current detector 156 and the V-phase current detector 154 are configured to output, respectively, a U-phase current detection signal Siu and a V-phase current detection signal Siv in such a manner that the U-phase current detection signal Siu and the v-phase current detection signal Siv take opposite polarities to the electric potentials Vsu, Vsv which are measured from the grounded line GND which constitutes the reference.

Figure 4:
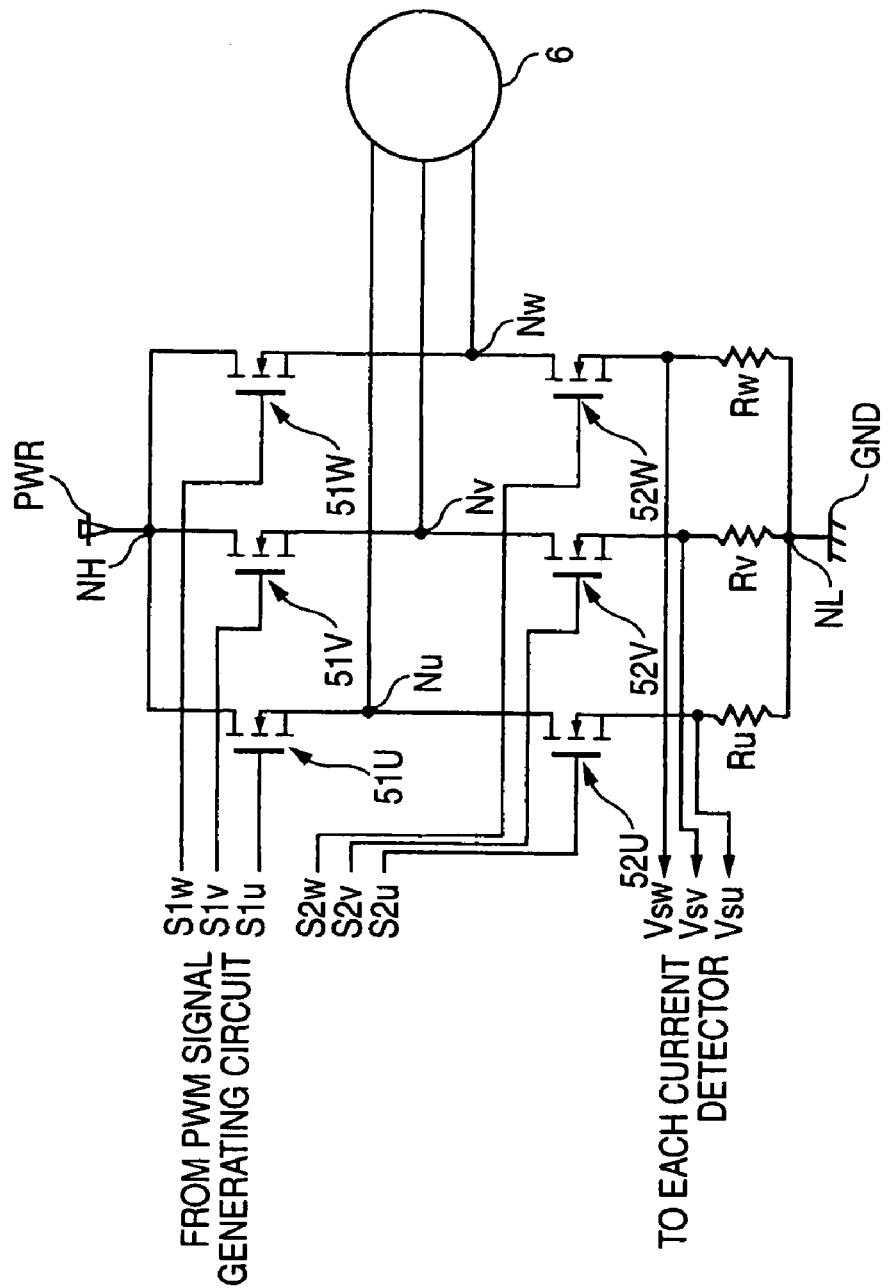
FIG. 4 is a circuit diagram showing a second layout example of the detection resistors which are inserted into the motor driving circuit for detecting current in respective phases of the brushless motor.

FIG. 4 is a circuit diagram showing a second layout example of detection resistors which are inserted into the motor driving circuit 152. A similar configuration to the configuration shown in FIG. 3 is shown in FIG. 4 as the configuration of the motor driving circuit 152, and a U-phase current detection resistor Ru and a V-phase current detection resistor Rv are also disposed at similar positions to the layout positions shown in FIG. 3. In the second layout example, in addition to what has just been described, a detection resistor Rw for detecting current flowing to the Lo-side FET 52W or current flowing to a lower arm corresponding to the W-phase (hereinafter, referred to as a "W-phase current detection resistor") is inserted between the Lo-side FET 52W which corresponds to the Lo-side FET 52W and the ground-side branch point NL.

In this case, the configuration of the ECU 5 becomes different from the configuration shown in FIG. 3 and includes the W-phase current detector in addition to the U-phase current detector 156 and the V-phase current detector 154. Then, a connecting point between the Lo-side FET 52W and the W-phase current detection resistor Rw is connected to an input terminal of the W-phase current detector, and the W-phase current detector outputs a signal indicating the electric potential Vsw of the connecting point which is so measured from the grounded line GND which constitutes a reference or a voltage between ends of the W-phase current detection resistor Rw as the W-phase current detection signal Siw. However, since current flowing into the brushless motor 6 is regarded as positive, the W-phase current detector outputs the W-phase current detection signal Siw in such a manner that the W-phase current detection signal takes an opposite polarity to the electric potential Vsw of the connecting point which is measured from the grounded line GND which constitutes the reference. In this case, in the ECU 5, the detected current value correcting unit 170 calculates a U-phase motor current value imu, a V-phase motor current value imv, and a W-phase motor current value imw based on the U-phase current detection signal Siu, the V-phase current detection signal Siv and the W-phase current detection signal Siw, respectively, and the 3-phase alternating current/d-q coordinates transforming unit 138 is configured to calculate a d-axis motor current value id and a q-axis motor current value iq from the U-phase motor current value imu, V-phase motor current value imv and the W-phase motor current value imw.

Figure 5:
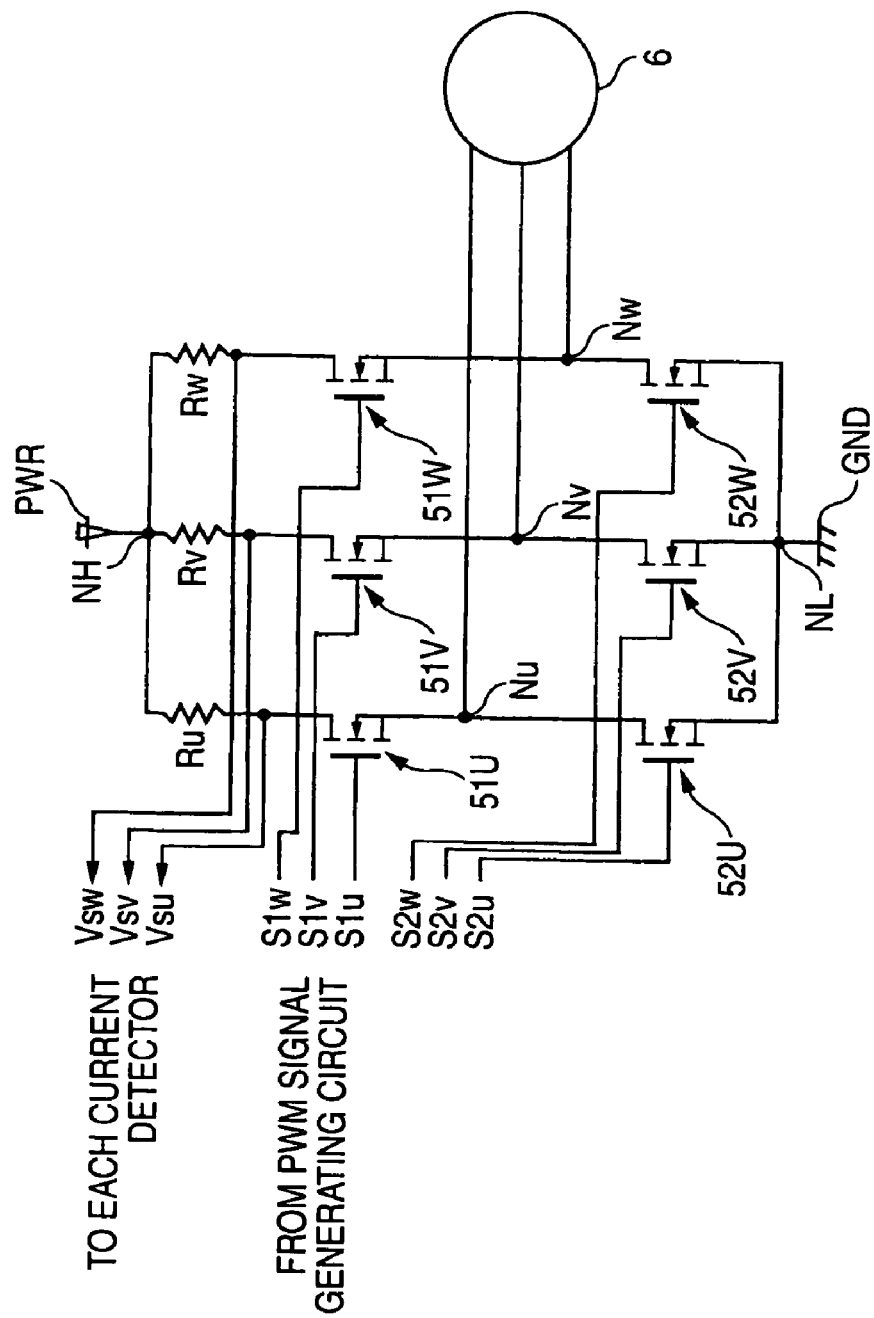
FIG. 5 is a circuit diagram showing a third layout example of the detection resistors which are inserted into the motor driving circuit for detecting current in respective phases of the brushless motor

FIG. 5 is a circuit diagram showing a third layout example of detection resistors which are inserted into the motor driving circuit 152. Also in FIG. 5, while the configuration of the motor driving circuit 152 is similar to the configuration shown in FIG. 3, in this third layout example, detection resistors are all inserted into upper arms, which is different from the first and second layout examples in which the detection resistors Ru, Rv, Rw are inserted into the lower arms. Namely, assuming that a connecting point where a power supply line PWR branches toward Hi-side FETs 51U, 51V, 51W is referred to as a "power supply-side branch point NH," a detection resistor for detecting current flowing to the Hi-side FET 51U corresponding to the U-phase or current flowing to an upper arm corresponding to the U-phase is inserted between the Hi-side FET 51U and the power supply-side branch point NH as a U-phase current detection resistor Ru. In addition, a detection resistor for detecting current flowing to the Hi-side FET 51V corresponding to the V-phase or current flowing to an upper arm corresponding to the V-phase is inserted between the Hi-side FET 51V and the power supply-side branch point NH as a V-phase current detection resistor Rv. Furthermore, a resistor for detecting current flowing to the Hi-side FET 51W corresponding to the W-phase or current flowing to an upper arm corresponding to the W-phase is inserted between the Hi-side FET 51W and the power supply-side branch point NH as a W-phase current detection resistor Rw.

In this case, a connecting point between the Hi-side FET 51U and the U-phase current detection resistor Ru is connected to an input terminal of the U-phase current detector 156, and the U-phase current detector 156 outputs a signal indicating the electric potential Vsu of the connecting point which is measured from the power supply line PWR which constitutes a reference or a voltage between ends of the U-phase current detection resistor Ru as a U-phase current detection signal Siu. In addition, a connecting point between the Hi-side FET 51V and the V-phase current detection resistor Rv is connected to an input terminal of the V-phase current detector 154, and the V-phase current detector 154 outputs a signal indicating the electric potential Vsv which is measured from the power supply line PWR which constitutes a reference or a voltage between ends of the V-phase current detection resistor Rv as a V-phase current detection signal Siv. Then, a connecting point between the Hi-side FET 51W and the W-phase current detection resistor Rw is connected to an input terminal of the W-phase current detector, and the W-phase current detector outputs a signal indicating the electric potential Vsw which is measured from the power supply line which constitutes a reference or a voltage between ends of the W-phase current detector Rw as a W-phase current detection signal Siw. However, since current flowing into the brushless motor 6 is regarded as positive, the U-phase current detector 156, the V-phase current detector 154, and the W-phase current detector output, respectively, the U-phase current detection signal Siu, the V-phase current detection signal Siv, and the W-phase current detection signal Siw in such a manner that the U-phase current detection signal Siu, the V-phase current detection signal Siv, and the W-phase current detection signal Siw take an opposite polarity to the electric potentials Vsu, Vsv, Vsw of the connecting points which are measured from the power supply line PWR which constitute the references. Note that in this third layout example, while the detection resistors Ru, Rv, Rw are inserted, respectively, into the three upper arms which correspond, respectively, to the U-phase, V-phase and W-phase, since the motor current of any one of the three phases can be calculated from the motor currents of the remaining two phases thereof, there may be adopted a configuration in which the detection resistors are inserted into only the two phases, for example, only two upper arms corresponding to the U-phase and V-phase, and in this case, the ECU 5 adopts the configuration shown in FIG. 2.

<4. Detection of Motor Current and Offset Correction>

Offset correction values iuO, ivO (, iwO) for correcting current detected values from the current detection signals Siu, Siv (, Siw) which are generated based on the detection resistors Ru, Rv (, Rw) as has been described above are obtained by the offset updating unit 172, and motor current values imu, imv (, imw) are calculated when the current detected values are corrected based on the offset correction values iuO, ivO (, iwO) by the detected current value correcting unit 170. Due to this, in this embodiment, as shown in FIG. 2, the current detected signal Siu, Siv are A/D converted within the microcomputer 10 and are inputted into the offset updating unit 172 and the detected current correcting unit 10 as time series data iu, iv which comprise digital values (sampling values) indicating current detected values. In this A/D conversion, the current detection signal Siu is sampled in not only a time period when the Lo-side FET corresponding to the U-phase (hereinafter, referred to as a "U-phase Lo-side FET") 52U is ON but also a time period when the same FET 52U is OFF, and the time series data iu made up of values of the current detection signals Siu sampled at those sampling time points (sampling values) are inputted into the offset updating unit 172 and the detected current value correcting unit 170. In addition, the current detection signal Siv is sampled in not only a time period when the Lo-side FET (hereinafter, referred to as a "V-phase Lo-side FET") 52V is ON but also a time period when the same FET 52V is OFF, and the time series data iv made up of values of current detection signals Siv sampled at those sampling time points (sampling values) are inputted into the offset updating unit 172 and the detected current value correcting unit 170.

The offset updating unit 172 updates the U-phase offset correction value iuO which is retained in the detected current value correcting unit 170 with, of the time series data iu, iv which are made up of the current detected values as the sampling values, the sampling value sampled in the time period when the U-phase Lo-side FET 52U is OFF (hereinafter, referred to as an "OFF period sampling value") so as to constitute a new offset correction value and also updates the V-phase offset correction value ivO which is retained in the detected current value correcting unit 170 with the sampling value sampled in the time period when the V-phase Lo-side FET 52V is OFF (an OFF period sampling value) so as to constitute a new offset correction value. While the update here may be implemented every time a single OFF period sampling value is inputted, the update may be implemented every time a predetermined number of sampling values are inputted or at predetermined intervals. On the other hand, the detected current value correcting unit 170 calculates a U-phase motor current value imu by subtracting the offset correction value iuO from, of the time series data iu, iv, the sampling value sampled in the time period when the U-phase Lo-side FET 52U is ON (hereinafter, referred to as an "ON period sampling value") and also calculates a V-phase motor current value imv by subtracting the offset correction value ivO from the sampling value sampled in the time period when the V-phase Lo-side FET 52V is ON (an ON period sampling value). Note that as is seen from what has been described above, the current detecting device for detecting a motor current in this embodiment is realized by the detection resistors Ru, Rv which are provided within the motor driving circuit 152, the U-phase current detector 156 and V-phase current detector 154, and the A/D converter provided within the microcomputer 10 for converting the current detection signals Siu, Siv into digital values.

The detailed operation of the offset updating unit 172 and the detected current value correcting unit 170, which are used for the detection of motor current, will be described below by reference to FIGS. 6 to 8. Note that while, in reality, in addition to the offset correction, a gain correction is implemented on current detected values, since the gain correction is not directly related to the invention, the description thereof is omitted herein. In addition, while, in the following description, the first layout example of detection resistors shown in FIG. 3 is taken as a premise and the detecting operation of the U-phase current in the motor 6 is described as being an example, since other layout examples and the detecting operation of motor current in the other phases become clear from the description to be made below, the description thereof will be omitted herein. Furthermore, while current supplied to the brushless motor 6 is normally a current which varies in a sine wave fashion, the current so supplied is shown as taking a predetermined constant value in FIGS. 6 to 8 as a matter of conveniences.

Figure 6:
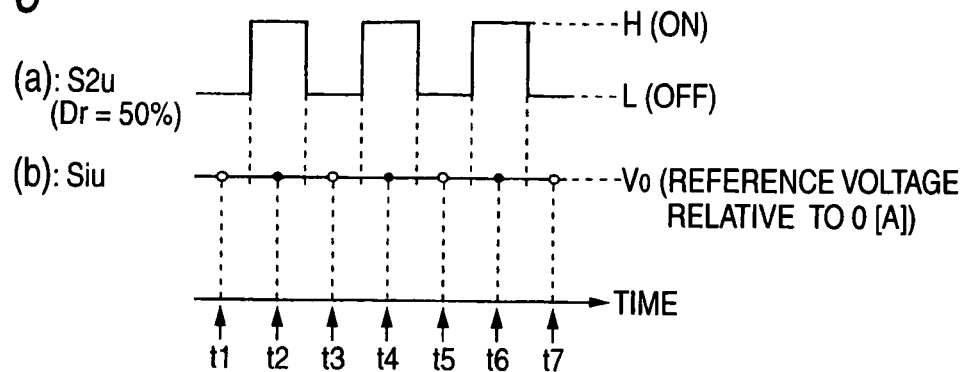
FIG. 6 is a signal waveform chart for explaining the operation of detecting motor current when no U-phase current flows to the motor in the embodiment.

FIG. 6 is a signal waveform chart for explaining the detecting operation of the motor 6 according to the embodiment (in a case where the U-phase current is zero). In this case, the duty ratios (ratio of time period when FETs are switched on) Dr of the Hi-side FET (hereinafter, referred to as a "U-phase Hi-side FET") 51U and the Lo-side FET 52U which correspond to the U-phase are both 50%, a PWM signal provided to a gate terminal of the U-phase Lo-side FET (hereinafter, referred to as a "U-phase Lo-side PWM signal") S2u takes a waveform shown in FIG. 6A. Note that a PWM signal provided to a gate terminal of the U-phase Hi-side FET 51U (hereinafter, referred to as a "U-phase Hi-side PWM signal") S1u has a complementary relation to the U-phase Lo-side PWM signal S2u in order to make the U-phase Hi-side FET 51U switch on and off in an opposite fashion to the U-phase Lo-side FET 52U. Namely, the U-phase Hi-side PWM signal S1u becomes an L level when the U-phase Lo-side PWM signal is at an H level and becomes the H level when the U-phase PWM signal S2u is at the H level (the same applies to the following description).

In this case, since no current flows to the U-phase current detection resistor Ru shown in FIG. 3, the U-phase current detection signal Siu takes a waveform shown in FIG. 6B. The U-phase current detection signal Siu (hereinafter, in the event that the U-phase current detection signal Siu is clearly indicated as being a function of time t, the same signal is so represented by "Siu(t)") is sequentially converted into a U-phase current detected value iu which is a digital value by the A/D converter within the microcomputer 10 and is then inputted into the detected current value correcting unit 170 and the offset updating unit 172. In this A/D conversion, as shown in FIG. 6B, sampling time points are set such that the sampling value of the U-phase current detected signal Siu sampled in the time period when the U-phase Lo-side FET 52U is ON and the sampling value of the U-shape current detected signal Siu sampled in the time period when the U-phase Lo-side FET 52U is OFF appear alternately (in FIG. 6B, the sampling value sampled in the ON period is represented by a black circle, whereas the sampling value sampled in the OFF period is represented by a while circle. The same applies to charts which will be referred to later on). Assuming now that a U-phase current detected value as a sampling value sampled at a sampling time point tk is represented as iuk=Siu(t) (k=1, 2, . . . ), $iu_1$, $iu_3$, $iu_5$, . . . are the OFF period sampling values, and $iu_2$, $iu_4$, $iu_6$ . . . are the ON period sampling values. In this embodiment, irrespective of the duty ratios of the PWM signals (consequently, irrespective of the ON/OFF ratio of the U-phase Lo-side FET 52U), the sampling time points t1, t2, t3, . . . are set to be within the OFF period of the U-phase Lo-side FET 52U, whereas t2, t4, t6, . . . are set to be within the ON period. A sampling pulse for setting the sampling time points can easily be generated from, for example, a signal that is used in generating a PWM signal such as the U-phase Lo-side PWM signal S2u.

The offset updating unit 172 sequentially updates the U-phase offset correction value iuO with, of the U-phase current detected values iuk (k=1, 2, 3, . . . ) as the time series data made up of the aforesaid sampling values, the OFF period sampling values $iu_1$, $iu_3$, $iu_5$, . . . as new offset correction values. On the other hand, the detected current correcting unit 170 sequentially calculates a U-phase motor current value imu at the sampling time points t2, t4, t6, . . . within the ON period of the U-phase Lo-side FET 52U by subtracting the offset correction value iuO from the ON period sampling values $iu_2$, $iu_4$, $iu_6$ . . . of the U-phase current detected values iuk (k=1, 2, 3, . . . ) which are the aforesaid time series data.

Figure 7:
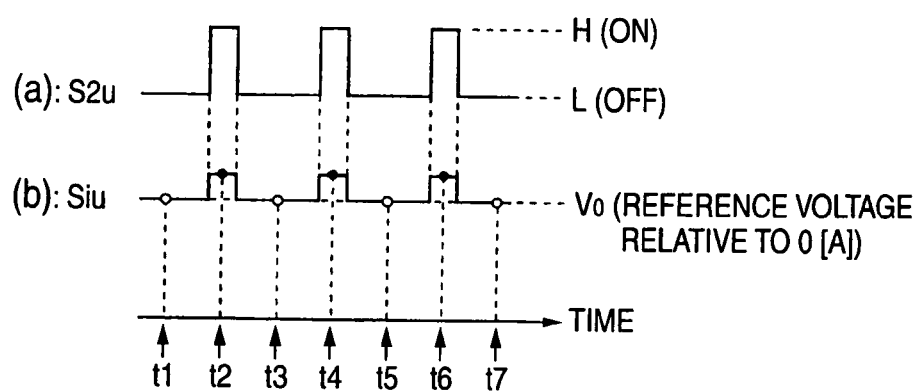
FIG. 7 is a signal waveform chart for explaining the operation of detecting motor current when a U-phase current flows from the driving circuit into the motor in the embodiment (with the U-phase current being positive)

FIG. 7 is a signal waveform chart for explaining the operation of detecting motor current when a U-phase current flows into the motor 6 from the driving circuit 152 in the embodiment of the invention (with the U-phase current being positive). In this case, in order to make the ratio of the time period when the U-phase Hi-side FET SIU is ON larger than 50% and, in association with this, to make the ratio of the time period when the U-phase Hi-side FET 51U is ON smaller than 50%, the Lo-side PWM signal S2u takes a waveform shown in FIG. 7A. Then, while current flows from the power supply line PWR to the motor 6 via the U-phase Hi-side FET 51U in the time period when the U-phase Hi-side FET 51U is ON, since the U-phase Lo-side PWM signal S2u is then at an L level with the U-phase Hi-side FET 52U being in the OFF state, no current flows to the detection resistor Ru shown in FIG. 3. Namely, as with the case shown in FIG. 6, no current flows to the detection resistor Ru at sampling time points t1, t3, t5, . . . shown in FIG. 7. In contrast to this, in the time period when the U-phase Hi-side FET 51U is OFF, the U-phase Lo-side PWM signal S2U is at an H level with the U-phase Lo-side FET 52U being in the ON state, and current flows from the grounded line GND to the motor 6, which is an inductive load, via the U-phase Lo-side FET 52U. Due to this, values of the U-phase current detection signal Siu at sampling time points t2, t4, t6, . . . or the ON period sampling values $iu_2$, $iu_4$, $iu_6$ . . . indicate the u-phase current value of the motor 6 iu$_2$, iu$_4$, iu$_6$ . . . . Then, as has been described above, the offset updating unit 172 sequentially updates the U-phase off set correction value iuO with values of the U-phase current detection signal Siu at sampling time points t1, t3, t5, . . . or the OFF period sampling values iu$_1$, iu$_3$, iu$_6$, . . . as new offset correction values, and the detected current value correcting unit 170 sequentially calculates a U-phase motor current value imu (positive value) by subtracting the offset correction value iuO from the ON period sampling values iu$_2$, iu$_4$, iu$_6$ . . . . For example, a value corresponding to Siu(t2)−Siu(t1)=iu$_2$−iu$_1$ is calculated as the U-phase motor current value imu at the time t2.

Figure 8:
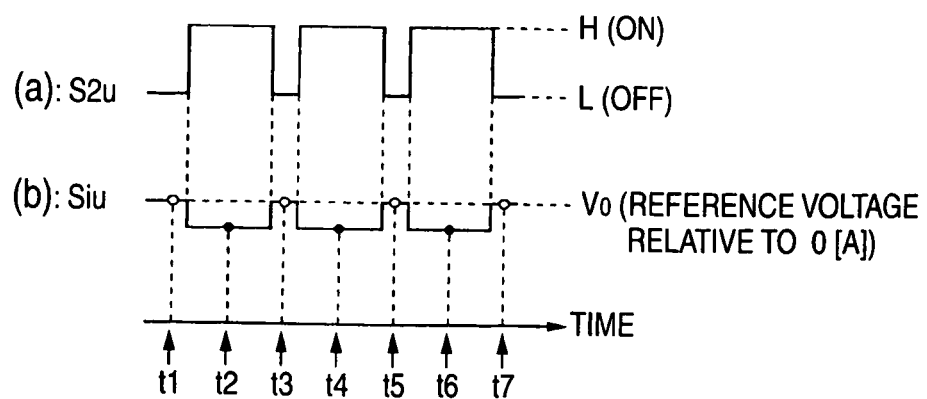
FIG. 8 is a signal waveform chart for explaining the operation of detecting motor current when a U-phase current flows from the motor into the driving circuit (with the U-phase current being negative)

FIG. 8 is a signal waveform chart for explaining the detecting operation of motor current when a U-phase current flows from the motor 6 to the driving circuit 152 in the embodiment of the invention (with the U-phase current being negative). In this case, in order to make the ratio of the time period when the U-phase Lo-side FET 52U is ON smaller and, in association with this, to make the ratio of time period when the U-phase Lo-side FET 52U is ON smaller than 50%, the Lo-side PWM signal S2u takes a waveform shown in FIG. 8A. In this case, in a time period, as shown in FIG. 8B, when the U-phase Lo-side PWM signal Siu is at an H level with the U-phase Lo-side FET 52U being ON, current flows from the motor 6 to the grounded line GND via the U-phase Lo-side FET 52U. Due to this, values of the U-phase current detection signal Siu at sampling time points t2, t4, t6 . . . or ON period sampling values iu$_2$, iu$_4$, iu$_6$ . . . indicate the U-phase current value in the motor 6. In contrast to this, in a time period, as shown in FIG. 8B, when the U-phase Lo-side PWM signal S2u is at an L level with the U-phase Lo-side FET 52U being OFF, the U-phase Hi-side FET 51U is put in the ON state, current flows from the motor 6, which is the inductive load, to the power supply line PWR via the U-phase Hi-side FET 51U, no current flowing to the detection resistor Ru shown in FIG. 3. Then, as has been described above, the offset updating unit 172 sequentially updates the U-phase offset correction value iuO with values of the U-phase current detection signal Siu at sampling time points t1, t3, t5 . . . or OFF period sampling values iu$_1$, iu$_3$, iu$_5$ . . . as new offset correction values, and the detected current value correcting unit 170 sequentially calculates a U-phase motor current value imu (negative) at the sampling time points t2, t4, t6 . . . by subtracting the offset correction value iuO from the ON period sampling values iu$_2$, iu$_4$, iu$_6$ . . . .

Note that while in the embodiment that has been described heretofore, the sampling time points are set such that the single ON period sampling value and the single OFF period sampling value correspond, respectively, to the single ON period and single OFF period of the switching element or U-phase Lo-side FET 52U which are included in the lower arm including the detection resistors Ru, the invention is not limited thereto, and for example, the sampling time points may be set such that a plurality of ON period sampling values and a plurality of OFF period sampling values correspond, respectively, to to the single ON period and single OFF period.

<5. Advantages>

As has been described heretofore, with the electric power-assisted steering system according to the embodiment of the invention, the PWM type driving circuit is used, and not only current in the time period when the FET, which is the switching element within the lower arm, is ON but also current in the time period when the FET is OFF are sequentially detected by the detection resistors Ru, Rv which are inserted into the lower arms or upper arms of the driving circuit (refer to FIGS. 6 to 8). Then, the offset correction value iuO is sequentially updated by the current detected values (iu$_1$, iu$_3$, iu$_5$ . . . ) in the time period when the FET is OFF, and the motor current values imu and imv are sequentially calculated when the current detected values (iu$_2$, iu$_4$, iu$_6$ . . . ) in the time period when the FET is ON are corrected by the offset correction value iuo, whereby the driving of the motor 6 is controlled using these motor current values imu and imv (refer to FIG. 2). Thus, according to the invention, since the offset correction value for correcting the offset error in the detection of motor current during the operation of the electric power-assisted steering system is sequentially obtained as the measured value, not as an estimated one, the update of the retained offset correction values iuO, ivO can be implemented at any time based on the latest measured value, and moreover, there is no need to set the electric power-assisted steering system in the special state in order to obtain an offset correction value as a measured value, whereby there is obtained an advantage that the generation of torque ripple in the brushless motor 6 can be suppressed, thereby making it possible to provide the electric power-assisted steering system which does not make the driver feel a feeling of physical disorder when manipulating the steering wheel.

<6. Modified Examples>

While in the embodiment, while the 3-phase brushless motor 6 is used as the driving source for the electric power-assisted steering system, the number of phases of the motor 6 may be equal to or larger than four, and the detection resistor may be inserted in the upper arm or lower arm which includes one of the power supply-side switching element and the ground-side switching element in such a manner that current flowing to the one of the power supply-side and ground-side switching elements in each arm or predetermined arms (the number of arms is smaller by one than the number of phases) in the driving circuit.

In addition, even in the event that a motor with a brush is used as the driving source for the electric power-assisted steering system instead of the brushless motor 6, the invention can be applied, provided that the PWM type driving circuit is used. Then, the current detected values are sequentially obtained when the one of the power supply-side switching element and the ground-side switching element in each arm or predetermined arms in the driving circuit is both in the ON state and OFF state by means of the device for detecting the current flowing to the one of the switching elements, whereby the update of the offset correction value for correcting the offset error in the detection of motor current with the measured value can be enabled at any time, thereby making it possible to provide the electric power-assisted steering system which does not make the driver feel a feeling of physical disorder when manipulating the steering wheel.

Furthermore, while in the embodiment, the detection resistor is inserted in the upper arm or lower arm in the motor driving circuit 152, the current detecting device is not limited to one utilizing the detection resistors, and a configuration may be adopted in which other detecting elements are used instead of the detection resistors for detecting current flowing to the upper arm or lower arm.

In addition, the invention can be applied to a hydraulic power-assisted steering system in which the steering assistance is provided by hydraulic pressure from a pump driving by an electric motor in order to detect current flowing to the electric motor.

What is claimed is:

1. A power-assisted steering system for applying an auxiliary steering force to a steering mechanism of a vehicle by driving an electric motor based on a target value determined in accordance with an operation by an operation unit for steering the vehicle, the power-assisted steering system comprising:
   a PWM type driving circuit that includes a switching element pair having a first switching element disposed on a power supply line side and a second switching element disposed on a grounded line side and connected to each other in series, adapted to supply current to the electric motor from a connecting point between the first switching element and the second switching element;
   a current detector that detects current flowing to one of the first switching element and the second switching element;
   a correcting unit that corrects a first detected value of the current detected by the current detector when the one of the first and second switching elements is in an ON state based on a second detected value of current detected by the current detector when the one of the first and second switching elements is in an OFF state, and outputs the corrected detected value; and
   a controller that controls the driving of the electric motor by switching on and off the first switching element and the second switching element based on the target value and the corrected detected value.

2. The power-assisted steering system according to claim 1, wherein the current detector detects current flowing to the one of the first and second switching elements in each period when the one of the first and second switching elements is put in the ON state and in each period when the one of the first and second switching elements is put in the OFF state, and wherein
   the correcting unit includes:
   a detected-current-value correcting unit that retains, as an offset correction value, the second detected value of current detected by the current detector when the one of the first and second switching elements is in the OFF state, corrects the first detected value of current detected by the current detector when the one of the first and second switching elements is in the ON state based on the offset correction value, and outputs the first corrected detected value after the correction; and
   an offset updating unit that updates, as a new offset correction value, the retained offset correction value with a third detected value of current detected by the current detector when the one of the first and second switching element is in the OFF state.

3. The power-assisted steering system according to claim 1, wherein the current detector includes a detection resistor inserted between the one of the first and second switching elements and the power supply line side or the grounded line side and detects current flowing to the one of the first and second switching elements based on a voltage between opposite ends of the detection resistor.

4. The power-assisted steering system of claim 1, wherein the switching element pair are connected in series.

5. The power-assisted steering system of claim 1, wherein the controller switches on and off the first switching element and the second switching element complementarily.

6. The power-assisted steering system of claim 1, wherein the second detected value corresponds to an offset error in the first detected value.

7. The power-assisted steering system of claim 6, wherein the correcting unit corrects the first detected value by subtracting the second detected value from the first detected value.

8. The power-assisted steering system of claim 6, wherein the correcting unit stores the second detected value as an offset correction value.

9. The power-assisted steering system of claim 1, wherein the controller switches the first switching element and the second switching element periodically and wherein the correcting unit stores the second detected value as an offset correction value.

10. The power-assisted steering system of claim 9, wherein the second detected value is detected during a first period.

11. The power-assisted steering system of claim 10, wherein the current detector detects a third detected value of the current flowing through the one of the first switching element and the second switching element when the one of the first switching element and the second switching element is in the OFF state during a second period.

12. The power-assisted steering system of claim 11, wherein the correcting unit updates the offset correction value with the third detected value.

13. The power-assisted steering system of claim 1, wherein the PWM type driving circuit further comprises a third switching element disposed on a power supply line side and a fourth switching element disposed on a grounded line side and wherein the current detector detects the second detected value when one of the third and fourth switching elements is in an ON state.

14. A power steering system comprising:
   an electric motor;
   a driver for driving the electric motor and comprising a first switch on a power supply side of a connection to the electric motor and a second switch on a grounded line side of the connection to the electric motor;
   a current detector that detects current flowing to one of the first switch and the second switch and that outputs a detected value of the detected current;
   a corrector that corrects a first detected value of current that is detected by the current detector when the one of the first switch and the second switch is in an ON state based upon a second detected value of current when the one of the first switch and the second switch is in an OFF state to output a corrected value; and
   a controller that controls the driver based upon the corrected value.

15. The system of claim 14, wherein the controller comprises a pulse-width modulating controller that controls the first and second switches periodically.

16. The system of claim 15, wherein the second detected value is detected by the current detector during a first period.

17. The system of claim 16, wherein the corrector stores the second detected value as an offset correction value.

18. The system of claim 17, wherein the current detector detects a third detected value of the current flowing to the one of the first switch and the second switch when the one of the first switch and the second switch is in an OFF state during a second period.

19. The system of claim 18, wherein the corrector updates the offset correction value with the third detected value.

20. The system of claim 19, wherein the current detector detects a fourth detected value of the current flowing to the one of the first switch and the second switch when the one of the first switch and the second switch is in an ON state during a third period.

21. The system of claim 20, wherein the corrector corrects the fourth detected value based upon the updated offset correction value.

22. The system of claim 14, wherein the driver further comprises a third switch disposed on a power supply line side and a fourth switch disposed on a grounded line side and wherein the current detector detects the second detected value when one of the third and fourth switch is in an ON state.

* * * * *